(12) United States Patent
Inamine (10) Patent No.: US 6,614,543 B1
(45) Date of Patent: Sep. 2, 2003

(54) IMAGE FORMING MACHINE-COMPUTER INTERFACE SYSTEM

(75) Inventor: Noboru Inamine, Ibaraki (JP)

(73) Assignee: Riso Kagaku Corporation, Tokyo (JP)

( * ) Notice: Subject to any disclaimer, the term of this patent is extended or adjusted under 35 U.S.C. 154(b) by 642 days.

(21) Appl. No.: 08/917,718

(22) Filed: Aug. 27, 1997

(30) Foreign Application Priority Data

Aug. 27, 1996 (JP) ............................................. 8-225394

(51) Int. Cl.[7] .............................. G06F 3/12; G06F 13/00
(52) U.S. Cl. ..................... 358/1.13; 358/1.15; 358/1.16; 358/1.6
(58) Field of Search ................................ 395/101, 112, 395/117, 114

(56) References Cited

U.S. PATENT DOCUMENTS

| | | |
|---|---|---|
| 5,268,993 A | 12/1993 | Ikenoue et al. |
| 5,748,861 A * | 5/1998 | Kashiwazaki ............... 395/110 |

FOREIGN PATENT DOCUMENTS

| | | |
|---|---|---|
| EP | 0 534 723 A2 | 3/1993 |
| EP | 0 577 087 A1 | 1/1994 |
| JP | 2-286384 | 11/1990 |
| JP | 6-4346 | 1/1994 |
| JP | 7-9733 | 1/1995 |
| JP | 7-225654 | 8/1995 |
| JP | 8-216482 | 8/1996 |

* cited by examiner

Primary Examiner—Gabriel Garcia
Assistant Examiner—Douglas Tran
(74) Attorney, Agent, or Firm—Sughrue Mion, PLLC (57) ABSTRACT

An interface system for a personal computer includes a data input device which receives data including a header portion and a data portion. The data is analyzed to determine whether the data includes environmental data or print data depending on a header code in a header portion. The environment data and the print data comprise separate data packets. Page data is prepared based on any environment data contained in the header, and the environment data is stored to a nonvolatile storage device. An output device outputs the page data based on the environment data stored to the nonvolatile storage device.

12 Claims, 5 Drawing Sheets

IMAGE FORMING MACHINE-COMPUTER INTERFACE SYSTEM

BACKGROUND OF THE INVENTION

This invention relates to an image forming machine-computer interface system connected between a computer and an image forming machine and used when print data from the computer is output to the image forming machine.

Hitherto, an image forming machine into which an original read section and an image formation section are integrated has been known as an image forming machine such as a PPC (plain paper copier) or a stencil printer. If an original of paper media is provided, only the stand-alone image forming machine can copy an original image at high speed.

An original image prepared by a text preparation application of a personal computer is often output from a printer for use as an original to be copied by the image forming machine.

An output image from a printer is an image faithfully reproduced on print paper by performing digital processing for an original image. To attempt to use the image forming machine to copy the output image, analog processing including optically reading the once output original again through the original read section is required, thus image degradation cannot be avoided.

To solve this problem, a digital connection can be made between the personal computer and the image forming machine for copying an original image prepared by the personal computer without degrading the image. At the time, normally a computer interface system is located between the personal computer and the image forming machine and plays a role in expanding print data input from the personal computer to pages and outputting the data to the image forming machine. At this time, the print data margin and vertical output direction are adjusted by changing the print setting of the personal computer whenever necessary.

However, to adjust the vertical output direction of an image in the conventional configuration, a large memory to hold 1-page data from the application in the personal computer is required and the function needs to be added directly to each application.

For the margin adjustment, a predetermined margin is fixedly set in the personal computer, thus if the image forming machines to which image data is output differ in margin, the margin of the application or the printer driver needs to be adjusted each time.

To construct a system comprising more than one image forming machine connected to one personal computer for outputting print data to the image forming machines for performing desired printing, the image forming machines differ in print characteristic and margin. Thus, if the same print data is output to the image forming machines, often the print conditions do not match.

Thus, whenever print data is output from the personal computer to each image forming machine, it is necessary to enable the vertical output direction and margin of an image to be adjusted by the printer driver, etc., in the image forming machine or on application software.

The interface system connected between the personal computer and the image forming machine has specifications varying depending on the image forming machine type. If the personal computer and the image forming machine differ in command (conversational) format, the interface system cannot be operated normally.

Thus, to connect a different type of image forming machine to the personal computer, the interface system needs to be changed to fit the specifications so that the command formats match.

SUMMARY OF THE INVENTION

It is therefore an object of the invention to provide an image forming machine-computer interface system for taking a load off a printer driver of a computer and providing the output result appropriate for a system also containing different types of image forming machines and peripheral machines of the image forming machines simply by setting an environment in the interface system independently of the application of the computer.

According to a first aspect of the present invention, there is provided an interface system between an image forming machine and a computer, comprising: data input means for receiving data from the computer; determining means for determining whether the data input through said data input means is print data or environment setting data; page data storing means for storing page data prepared based on the print data determined by said data determination means; and nonvolatile storage means for storing the environment setting data determined by said data determination means, for outputting the page data stored in said page data storage means to the image forming machine based on the environment setting data stored in said environment setting data storage means.

According to a second aspect of the invention, there is provided the interface system as described above, wherein the environment setting data and the print data may be input as data in separate packet formats.

According to a third aspect of the invention, there is provided the interface system as described above, further comprising a setting input device for entering the environment setting data wherein the environment setting data entered through the setting input device is input to the data input means.

According to a fourth aspect of the invention, there is provided the interface system as described above wherein the environment setting data may contain at least one of data indicating whether an output direction in a vertical scanning direction is forward or reverse, data indicating output start positions in horizontal and vertical directions, and data indicating a command format conforming to specifications matching the type of image forming machine.

According to the invention, the most recent environment setting data entered through the computer or the setting input device is stored in the nonvolatile storage means, the environment is set in response to the most recent environment setting data, and page data is output to the image forming machine (stencil printer) in accordance with the environment setting. Accordingly, output setting of the image forming machine appropriate for the environment can be carried out without the need for changing setting of the printer driver or application of the computer.

DETAILED DESCRIPTION OF THE PREFERRED EMBODIMENTS

Figure 1:
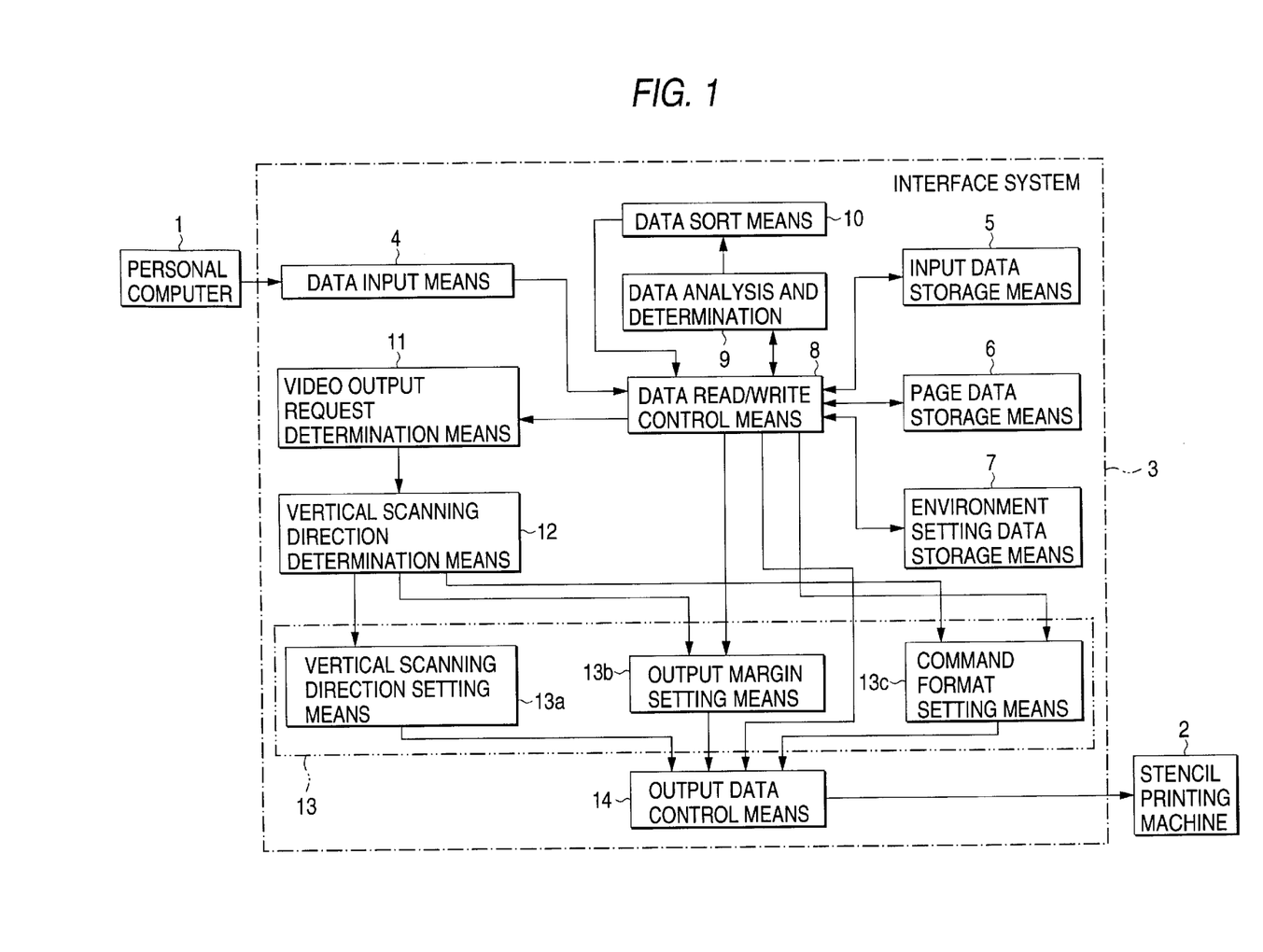
FIG. 1 is a block diagram of an image forming machine-computer interface system according to the invention.

FIG. 1 is a block diagram of an image forming machine-computer interface system according to the invention.

An interface system 3 is connected between a personal computer 1 and a stencil printing machine (image forming machine) 2 electrically via a connector cable (not shown).

The user uses the personal computer 1 to edit data for the stencil printing machine 2 to be controlled to perform desired stencil making or stencil printing by operating input means such as a keyboard and a mouse. Edited data D is input to the interface system 3. If environment setting of the stencil printing machine 2 is required, the user uses the personal computer 1 to enter environment setting data Db by operating input means such as the keyboard and the mouse.

Print data Da and the environment setting data Db are input from the personal computer 1 to the interface system 3 in separate packet formats in a time-sharing manner. Thus, when the print data Da is input from the personal computer 1, the environment setting data Db need not necessarily be input. In contrast, when the environment setting data Db is input, the print data Da need not necessarily be input.

Here, the environment setting data Db is made up of data indicating the output direction of the vertical scanning direction of an image (forward or reverse direction), data indicating a margin of the output start position of the image, data indicating the command format conforming to the specifications matching the type of stencil printer 2 that can be used with the interface system 3 and the like.

Figure 2:
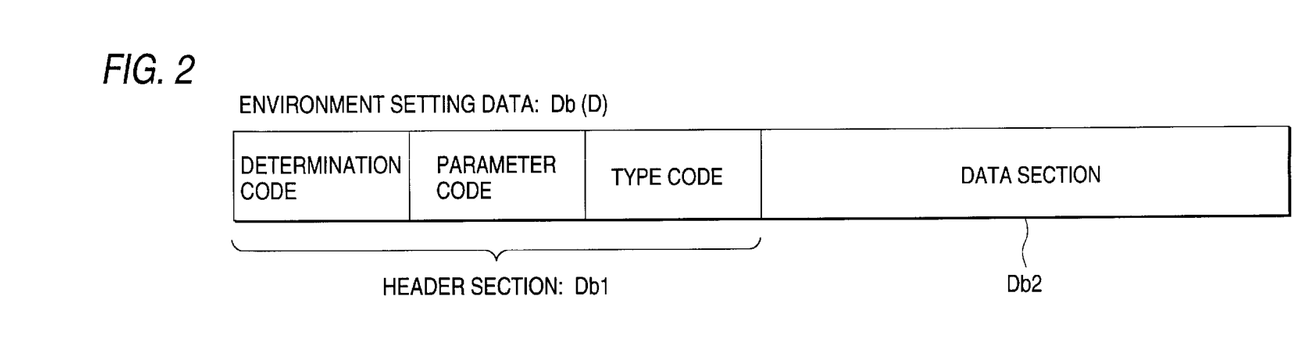
FIG. 2 is an illustration to show an example of a frame structure of environment setting data in the interface system in FIG. 1.

The data indicating a margin of the output start position of the image is given as distance information in horizontal and vertical directions relative to the position according to a margin preset fixedly in the personal computer FIG. 2 shows an example of a frame structure of the environment setting data.

The environment setting data Db generally comprises a header section Db1 and a data section Db2. The header section Db1 contains a determination code indicating the beginning of the packet, a parameter code indicating the number of data pieces, and a type code indicating the packet type. The data section Db2, which is actual environment data, is made up of data indicating the forward direction as the output direction of the vertical scanning direction of the image, data indicating the reverse direction as the output direction of the vertical scanning direction of the image, data indicating a margin of the output start position of the image, data indicating the command format conforming to the specifications matching the type of stencil printing machine 2 that can be used with the interface system 3 and the like, as described above.

FIGS. 3(a) and 3(b) show examples of a frame structure of print data.

Normal print data Da is roughly made up of a header section Da1 comprising a determination code indicating the beginning of the packet, a parameter code indicating the number of data pieces, and a type code indicating the packet type and a data section Da2 containing actual data.

The data contained in the data section Da2 of the normal print data Da is made up of various pieces of data concerning stencil making or stencil printing, such as a horizontal scanning direction address, a vertical scanning direction address, a 1-line raster image, line printing, page feed, the number of print sheets of paper, paper size and orientation, print speed, print density, and horizontal and vertical solutions.

In the print data Da, print data Daa of a video output request indicating the end of one page is made up of a 1-byte code like. 0X1E, for example, as shown in FIG. 3(b).

When the output direction of the vertical scanning direction, the margin of the output start position, and the command format are set in the interface system 3 based on the most recent environment setting data Db, the stencil printing machine 2 executes the stencil making or stencil print operation of a desired image in response to video output data sent from the interface system 3 in accordance with the setting.

The interface system 3 comprises data input means 4, input data storage means 5, page data storage means 6, environment setting data storage means 7, data read/write control means 8, data analysis and determination means 9, data sort means 10, video output request determination means 11, vertical scanning direction determination means 12, environment setting means 13, and output data control means 14.

The data input means 4 inputs data D from the personal computer 1 and outputs the input data to the data read/write control means 8.

The input data storage means 5 is made of a nonvolatile memory of a RAM (random access memory), for example. The data D input through the data input means 4 from the personal computer 1 is stored in the input data storage means 5. The data D stored in the input data storage means 5 is updated under the control of the data read/write control means 8 each time data is input to the data input means 4 from the personal computer 1.

The page data storage means 6 is made of the nonvolatile memory of a RAM also used as the input data storage means 5, for example. Raster image information for each line with position information on a page contained in the normal print data Da as an address is stored in the page data storage means 6. The raster image information is stored in the page data storage means 6 under the control of the data read/write control means 8 until print data of a video output request indicating the end of one page is input. Accordingly, the raster image information corresponding to one page is prepared and stored in the page data storage means 6 finally.

When the print data of a video output request indicating the end of one page is input, the raster image information stored in the page data storage means 6 is read based on the page output information contained in the print data under the control of the data read/write control means 8.

The environment setting data storage means 7 is made of a nonvolatile and readable/writable storage unit whose stored contents are not erased if the power of the interface system is turned off, such as a memory like a flash memory or an EEPROM (electrically erasable and programmable read only memory) or an external storage unit like a floppy disk drive or a hard disk drive. The most recent environment setting data Db sorted based on the analysis result of the data analysis and determination means 9 (described later) is stored in the environment setting data storage means 7. Whenever the environment setting data is fed to the data input means as data D, the most recent environment setting data Db is rewritten into the environment setting data storage means 7 under the control of the data read/write control means 8.

The data read/write control means 8 controls read and write of data D from and into the input data storage means 5. It also controls read and write of raster image information based on position information on a page or page output information contained in the print data Da from and into the page data storage means 6 and read and write of the environment setting data Db from and into the environment setting data storage means 7 in response to the analysis result of the data analysis and determination means 9.

The data analysis and determination means 9 analyzes the type code in the header section Da1, Db1 of the data D read from the input data storage means 5 by the data read/write control means 8 and determines whether the read data D is the normal print data Da or the environment setting data Db.

The data sort means 10 sorts the data D read from the input data storage means 5 by the data read/write control means 8 into the normal print data Da and the environment setting data Db based on the determination result of the data analysis and determination means 9.

Figure 3:
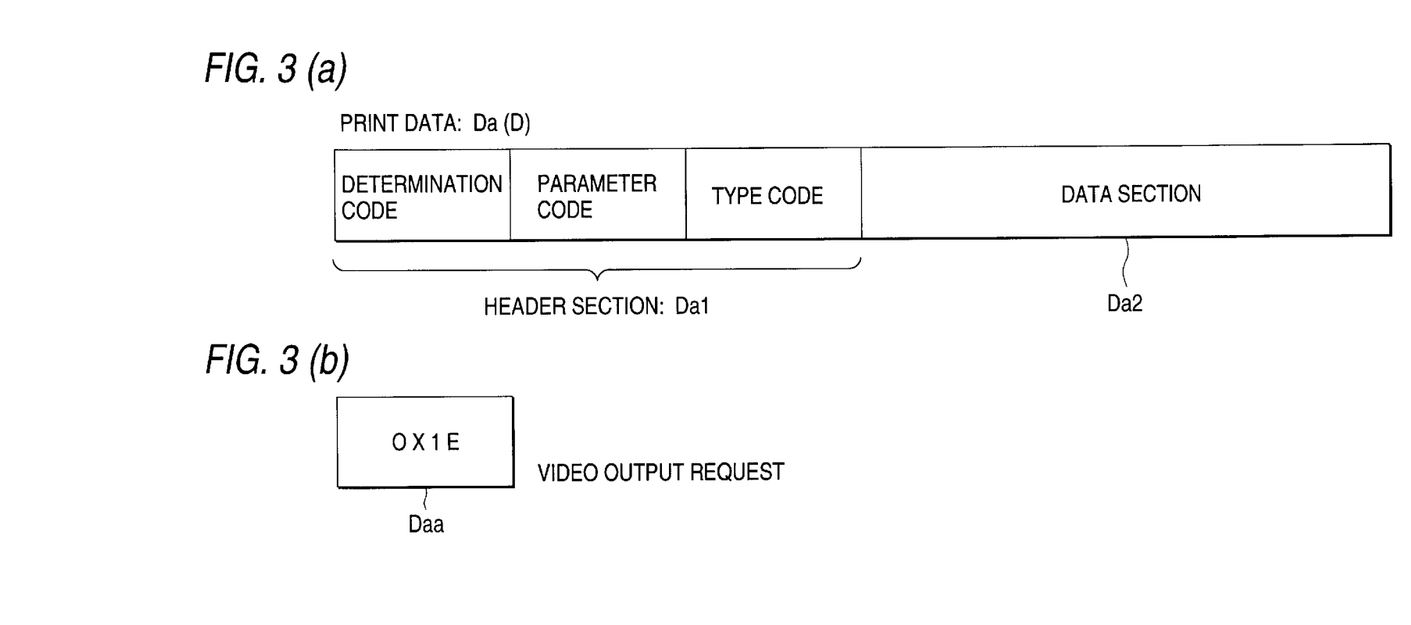
FIGS. 3(a) and 3(b) are illustration to show an example of a frame structure of print data in the interface system in FIG. 1.

The video output request determination means 11 analyzes the top part of the data D read from the input data storage means 5 by the data read/write control means 8 and determines whether or not a video output request is made. In the embodiment, if the data D read by the data read/write control means 8 is the data of a video output request shown in FIG. 3(*b*), the video output request determination means 11 determines that a video output request exists.

When the video output request determination means 11 determines that a video output request exists, the vertical scanning direction determination means 12 analyzes the data section Db2 of the most recent environment setting data Db read from the environment setting data storage means 7 by the data read/write control means 8 and determines whether vertical scanning direction data is forward or reverse.

The environment setting means 13 comprises vertical scanning direction setting means 13*a*, output margin setting means 13*b*, and command format setting means 13*c*.

When the vertical scanning direction determination means 12 determines that the vertical scanning direction data is forward, the vertical scanning direction setting means 13*a* sets output addresses and output bits of page data stored in the page data storage means 6 (input data from the personal computer 1) in the forward direction.

Figure 4:
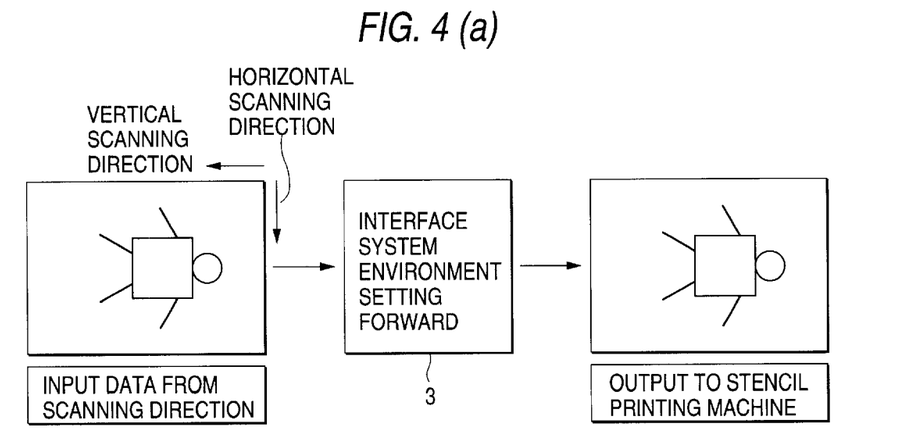
FIGS. 4(a) to 4(c) are illustration to show the relationships between input data from a personal computer and output data to a stencil printer based on setting of environment setting data in the interface system in FIG. 1.

That is, the vertical scanning direction setting means 13*a* sets the output addresses and output bits of the page data in the state in which the data read/write control means 8 reads the page data from the page data storage means 6 in the input order of data from the personal computer 1. Accordingly, the set data matches the input data from the personal computer 1 in the output direction in the vertical scanning direction, as shown in FIG. 4(*a*).

When the vertical scanning direction determination means 12 determines that the vertical scanning direction is reverse, the vertical scanning direction setting means 13*a* sets output addresses and output bits of page data (input data from the personal computer 1) in the reverse direction.

That is, the vertical scanning direction setting means 13*a* sets the output addresses and output bits of the page data in the state in which the data read/write control means 8 reads the page data from the page data storage means 6 in the reverse order to that of inputting data from the personal computer 1. Accordingly, the set data is inverted 180 degrees from the input data from the personal computer 1 in the output direction in the vertical scanning direction, as shown in FIG. 4(*b*).

When the video output request determination means 11 determines that a video output request exists, the output margin setting means 13*b* sets an output start margin. More particularly, the output start position are identified in resolution units based on output start margin distance information contained in the most recent environment setting data Db read from the environment setting data storage means 7 by the data read/write control means 8 and paper size and horizontal and vertical resolution data read from the input data storage means 5 by the data read/write control means 8 (input data from the personal computer). The distance to the identified position is added to the margin preset fixedly in the personal computer 1 and the resultant distance is set as the output start margin. (See FIG. 4(*c*).)

When the video output request determination means 11 determines that a video output request exists, the command format setting means 13*c* sets the command format contained in the most recent environment setting data Db read from the environment setting data storage means 7 by the data read/write control means 8.

The output data control means 14 controls output of 1-page data read from the page data storage means 6 as a video signal of the stencil printing machine 2 to be controlled in response to the output direction in the vertical scanning direction (forward or reverse), the output start position margin, and the command format set by the environment setting means 13.

Next, the operation according to the configuration will be discussed with reference to a flowchart in FIG. 5.

First, data D required for the stencil printer 2 to be controlled to perform stencil making or stencil printing is edited on the personal computer 1.

Here, if environment setting is required, the user enters environment setting data through input means such as the keyboard and the mouse. Data D from the personal computer 1 is fed to the data input means 4 of the interface system 3 in sequence in a time sharing manner in separate packet formats at step SP1. If the environment is set, data is sent to the interface system 3 in a time sharing manner in separate packet formats in the order of the environment setting data and print data.

The data D fed to the data input means 4 is stored in the input data storage means 5 by the data read/write control means 8. The data D stored in the input data storage means 5 is read by the data read/write control means 8 in sequence.

The header section Da1, Db1 of the read data D is analyzed by the data analysis and determination means 9 for determining whether the data is normal print data Da or environment setting data Db at step SP2. The read data D is sorted into the normal print data Da or environment setting data Db by the data sort means 10 based on the analysis result of the data analysis and determination means 9.

If the sorted data is the environment setting data Db at step SP2, the data Db is stored in the environment setting data storage means 7 as the most recent environment setting data at step SP3.

In contrast, if the sorted data is not environment setting data at step SP2 nor a video output request indicating the end of one page at step SP4 and is the normal print data Da, raster image information is stored in the page data storage means 6 with the position information on the page contained in the print data as an address at step SP5. This operation is repeated until a video output request indicating the end of one page is input and the raster image information corresponding to one page is stored in the page data storage means 6 (steps SP1–SP5).

When a video output request indicating the end of one page is input at step SP4, the most recent environment setting data is read from the environment setting data storage means 7 at step SP6. If the output direction in the vertical scanning direction contained in the most recent environment setting data read is forward at step SP7, the output addresses and output bits of page data are set in the forward direction at step SP8. While the output direction in the vertical scanning direction contained in the most recent environment setting data read is reverse at step SP7, the output addresses and output bits of page data are set in the reverse direction at step SP9.

Next, margins at output start positions in the horizontal and vertical directions are set in accordance with data indicating the margin at the output start position contained in the most recent environment setting data at step SP10, whereby the output direction in the vertical scanning direction (forward or reverse) and the margin at the output start position are set based on the most recent environment setting data and video output to the stencil printer 2 is started in accordance with the setting at step SP11.

By the way, data is prepared as A4 portrait in the personal computer 1, but it may be desired to print out data as A4 landscape at the stencil printer 2. To meet the demand, the horizontal and vertical directions of page data may be changed at steps SP7 to SP9, whereby data rotated 90 degrees is used as video output data.

Figure 5:
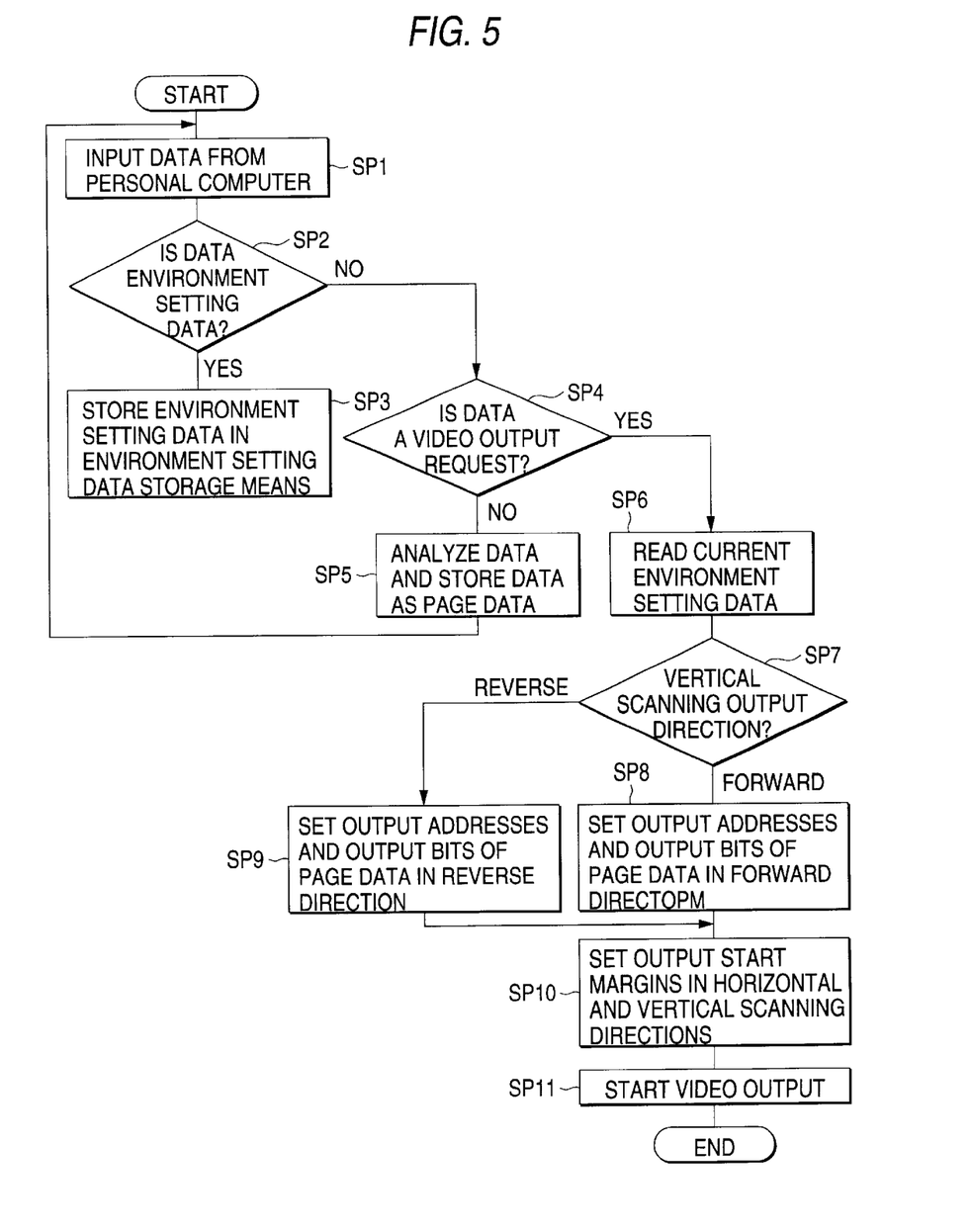
FIG. 5 is a flowchart to show the operation of the interface system in FIG. 1.

In the flowchart in FIG. 5, the print data is read after the environment setting data is stored; since the environment setting data and the print data are data in separate packet formats, the most recent environment setting data can also be only stored without reading the print data.

If data indicating the command format is contained as the most recent environment setting data read after the video output request is input although not shown in the flowchart in FIG. 5, the command format conforming to the specifications matching the type of stencil printing machine 2 to be controlled is set in accordance with the data.

According to the embodiment, the environment setting data is only input from application of the personal computer 1 to the independent interface system 3, whereby the most recent environment setting data is always stored in the nonvolatile environment setting data storage means 7 and video output is transmitted to the stencil printing machine 2 in response to environment setting based on the most recent environment setting data when the data indicating the end of one page is input. Therefore, a load is reduced from the printer driver of the personal computer 1. Accordingly, the output result appropriate for the system also containing different types of stencil printing machines 2 and peripheral machines of the stencil printing machines 2 is obtained.

For example, when one personal computer 1 and a number of stencil printers different in print characteristic are connected by the interface systems 3, if the margin differences among the stencil printing machines 2 are previously examined and the environment setting data is input so as to eliminate the differences for setting the environment in each interface system 3, the stencil printing machines 2 can be matched in print state.

If a sorter with an automatic stapler, for example, is connected to the stencil printer 2 as a peripheral machine to improve the system, the environment setting data can be changed to that responsive to the stapler placement position (output direction in the vertical scanning direction and margin at the output start position) for input; stencil making or stencil printing can be performed in accordance with the environment setting responsive to the system function.

For example, to bind the left in the paper longitudinal direction of printed sheets of paper, the output direction in the vertical scanning direction is set to forward and a margin at the output start position is set so that a sufficient left margin in the paper longitudinal direction can be obtained in the stapler placement configuration for binding the left in the paper longitudinal direction of printed sheets of paper discharged.

In contrast, in the stapler placement configuration for binding the right in the paper longitudinal direction of printed sheets of paper discharged, the output direction in the vertical scanning direction is set to the opposite direction. Alternatively, in addition to the setting, a margin at the output start position is set so that a sufficient right margin in the paper longitudinal direction can be taken.

If the margin varies depending on the type of stencil printing machine 2, the environment setting data input from the personal computer 1 can be changed for eliminating the margin difference. At the time, stencil making or stencil printing appropriate for the system can be accomplished without changing output data other than the environment setting data in the personal computer 1.

The most recent environment setting data is always stored in the environment setting data storage means 7 made of a nonvolatile memory and the storage contents are not lost if the power is turned off. Once the environment is set in the interface system 3, if it is not again set after the power is restored, video output is transmitted to the stencil printing machine 2 in accordance with the environment setting based on the most recent environment setting data before the power is turned off, so that the stencil making or stencil printing operation can be started promptly.

The environment between the stencil printer 2 and the interface system 3 does not change each time stencil making or stencil printing is executed; normally, it is semifixed. However, if the environment setting data is input as described above, the most recent environment setting data is always stored in the nonvolatile environment setting data storage means 7 and the environment is set based on the most recent environment setting data. Moreover, once the environment is set when the system is constructed, the desired stencil making or stencil printing operation can be performed in accordance with the environment setting.

To change the type of stencil printing machine 2 connected to the interface system 3, the data indicating the command format of the specifications matching the type of stencil printer 2 is input from the personal computer 1 as the environment setting data. Then, the data is stored in the environment setting data storage means 7 of a nonvolatile memory and the environment is set. Thus, the interface system 3 can execute data communication with the stencil printer 2 in accordance with the command format indicated by the data.

Figure 6:
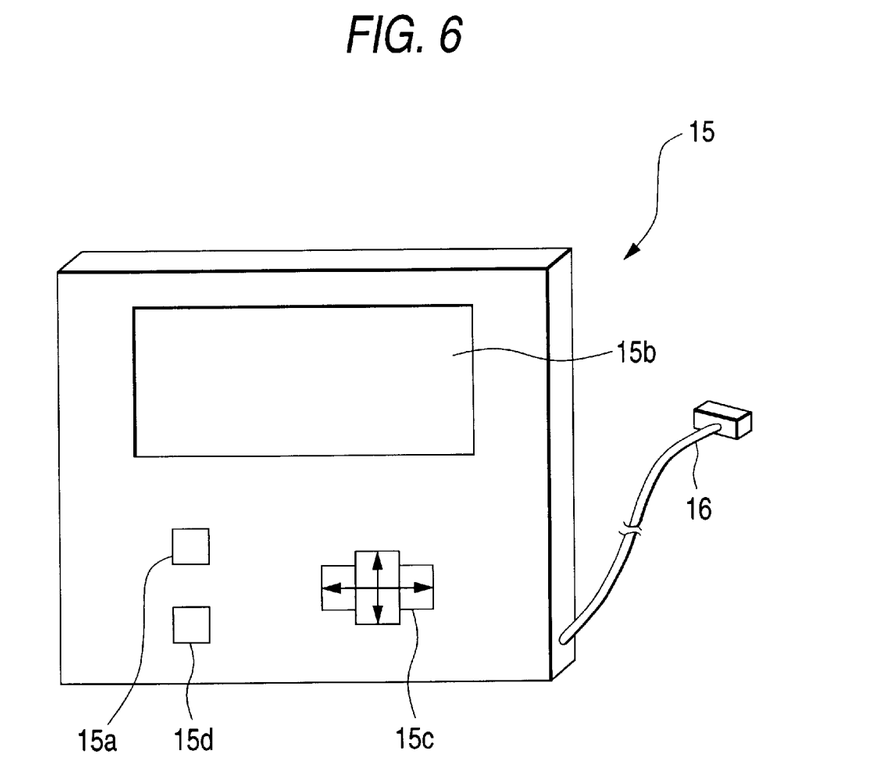
FIG. 6 is an illustration to show an example of a setting input device connected to the interface system in FIG. 1.

By the way, in the embodiment, the environment setting data is entered in the personal computer 1. However, a setting input device 15 as shown in FIG. 6 may be connected to the interface system 3 by a connector cable 16 for entering the environment setting data.

For example, the setting input device 15 comprises a mode key 15a for specifying the input mode, a display 15b for displaying the contents of environment setting data, such as the output direction in the vertical scanning direction, the margin at the output start position, and the command format, upper, lower, left, and right cursor keys 15c for selecting and specifying displayed environment setting data options, and a registration key 15d for registering the selected options.

When the mode key 15a of the setting input device 15 is pressed and the mode is changed to the input mode, environment setting data options are displayed on the display 15b. For example, if the environment setting data indicates the output direction in the vertical scanning direction, "forward" and "reverse" are displayed as options; if the environment setting data indicates the margin at the output start position, numeric values in mm units, for example, that can be incremented and decremented with the cursor keys 15c are displayed as options.

If the user selects an option with the cursor keys 15c and enters the option by pressing the registration key 15d, the contents of the option are input to the data input means 4 of the interface system 3 as the environment setting data.

As seen from the description made so far, according to the invention, the environment setting data is only input from application of the computer to the independent interface system, whereby the most recent environment setting data is always stored in the nonvolatile environment setting data storage means and page data is transmitted to the image forming machine in response to environment setting based on the most recent environment setting data. Therefore, a load is taken off the printer driver of the computer, and the output appropriate for the system also containing different types of image forming machines and peripheral machines of the image forming machines can be obtained.

For example, when one computer and a number of image forming machines different in print characteristic are connected by the interface systems, if the environment setting data is input so as to eliminate the margin differences among the image forming machines and the environment is set only once in each interface system, the image forming machines can be matched in print state.

If a sorter with an automatic staple function is connected to the image forming machine as a peripheral machine, the environment setting data can be changed to that responsive to the stapler placement position (output direction in the vertical scanning direction and margin at the output start position) for input.

The most recent environment setting data is always stored in the nonvolatile environment setting data storage means and the storage contents are not lost if the power is turned off. Once the environment is set, if it is not again set after the power is restored, page data is transmitted to the image forming machine in accordance with the environment setting based on the most recent environment setting data before the power is turned off, so that the printing operation can be started promptly.

To change the type of image forming machine connected to the interface system, if the data indicating the command format of the specifications matching the type of image forming machine is input as the environment setting data, it is stored in the environment setting data storage means of a nonvolatile memory and the environment is set. Thus, the image forming machine can be operated normally without changing the interface system connected to the computer.

What is claimed is:

1. An interface system between at least one image forming machine and a computer, comprising:
    data input means for receiving data from the computer, said data including a header portion and a data portion;
    determining means for determining whether the data input through said data input means is print data or environment setting data based on a header code included in the header portion of the data received from the computer;
    page data storing means for storing page data prepared based on the print data determined by said determining means;
    nonvolatile storage means for storing the environment setting data determined by said determining means; and
    an output means for outputting the page data stored in said page data storage means to the image forming machine based on the environment setting data stored in said nonvolatile storage means,
    wherein the environment setting data and the print data are input as data in separate packet formats.

2. The interface system according to claim 1, further comprising:
    a setting input device operable by a user for entering the environment setting data wherein the environment setting data entered through said setting input device is fed to said data input means.

3. The interface system according to claim 1, wherein the environment setting data contains at least one of data indicating whether an output direction in a vertical scanning direction is forward or reverse, data indicating output start positions in horizontal and vertical directions, and data indicating a command format conforming to specifications matching the type of image forming machine.

4. The interface system according to claim 2, wherein the environment setting data contains at least one of data indicating whether an output direction in a vertical scanning direction is forward or reverse, data indicating output start positions in horizontal and vertical directions, and data indicating a command format conforming to specifications matching the type of image forming machine.

5. An interface system between at least one image forming machine and a computer, comprising:
    data input means for receiving data from the computer, said data including a header portion and a data portion;
    determining means for determining whether the data input through said data input means is print data or environment setting data based on a header code included in the header portion of the data received from the computer;
    page data storing means for storing page data prepared based on the print data determined by said determining means;
    nonvolatile storage means for storing the environment setting data determined by said determining means; and
    an output means for outputting the page data stored in said page data storage means to the image forming machine based on the environment setting data stored in said nonvolatile storage means,
    wherein the environment setting data and the print data are input as data in separate packet formats, and
    wherein the environment setting data contains at least data indicating whether an output direction in a vertical scanning direction is forward or reverse and data indicating output start positions in horizontal and vertical directions.

6. The interface system according to claim 5, further comprising a setting input device operable by a user for entering the environment setting data wherein the environment setting data entered through said setting input device is fed to said data input means.

7. The interface system according to claim 5, wherein said nonvolatile storage means stores most recent environment setting data, and said output means consistently uses said most recent environment setting data to output page data stored in said page data storage means.

8. The interface system according to claim 7, wherein the environment setting data further comprises data indicating a command format conforming to specifications matching the type of image forming machine.

9. The interface system according to claim 7, further comprising a setting input device operable by a user for entering the environment setting data wherein the environment setting data entered through said setting input device is fed to said data input means.

10. The interface system according to claim 3, wherein the output start positions in horizontal and vertical directions are determined as distance information offset from a margin preset in the computer.

11. The interface system according to claim 7, wherein the output start positions in horizontal and vertical directions are determined as distance information offset from a margin preset in the computer.

12. The interface system according to claim 11, wherein the output start positions in the horizontal and vertical directions are determined in accordance with a binding margin for a binding device of said image forming machine.

* * * * *